US008643868B2

(12) United States Patent
Masao (10) Patent No.: US 8,643,868 B2
(45) Date of Patent: Feb. 4, 2014

(54) IMAGE TRANSMISSION APPARATUS, IMAGE DATA ACQUIRING APPARATUS, IMAGE DATA TRANSMISSION METHOD, PROGRAM FOR IMPLEMENTING THE METHOD, AND STORAGE MEDIUM FOR THE PROGRAM

(75) Inventor: Nozomi Masao, Tokyo (JP)

(73) Assignee: Canon Denshi Kabushiki Kaisha, Tokyo (JP)

( * ) Notice: Subject to any disclaimer, the term of this patent is extended or adjusted under 35 U.S.C. 154(b) by 1129 days.

(21) Appl. No.: 11/933,773

(22) Filed: Nov. 1, 2007

(65) Prior Publication Data

US 2008/0112022 A1    May 15, 2008

(30) Foreign Application Priority Data

Nov. 10, 2006  (JP) ................................. 2006-305802

(51) Int. Cl.
*G06F 3/12*        (2006.01)
*H04N 1/46*        (2006.01)
*H04N 1/00*        (2006.01)
*G03G 15/00*       (2006.01)
*G06F 15/16*       (2006.01)
*G06F 7/04*        (2006.01)

(52) U.S. Cl.
USPC ......... 358/1.15; 358/506; 358/1.13; 358/403; 399/2; 709/203; 726/26

(58) Field of Classification Search
USPC ................... 358/506, 1.15, 1.13, 403; 399/2; 709/203; 726/26
See application file for complete search history.

(56) References Cited

U.S. PATENT DOCUMENTS

| 6,738,798 B1 * | 5/2004 | Ploetz et al. | 709/203 |
| 7,301,658 B2 * | 11/2007 | Henry | 358/1.15 |
| 2003/0200266 A1 * | 10/2003 | Henry | 709/206 |

FOREIGN PATENT DOCUMENTS

JP    3594799    9/2004

* cited by examiner

*Primary Examiner* — Charlotte M Baker
*Assistant Examiner* — Rury Grisham
(74) *Attorney, Agent, or Firm* — Fitzpatrick, Cella, Harper & Scinto

(57) ABSTRACT

An image data transmission apparatus which are capable of improving reliability of log files by ensuring proper storing of log information about transferred image data. A preceding log, which includes information about the transmission of image data, is transmitted to a log file server connected with a scanner via a network. In the scanner, it is determined whether the log file server has succeeded in receiving or storing the preceding log. If the log file server has succeeded in receiving or storing the preceding log, the image data is transmitted to a designated destination of image data transmission.

9 Claims, 8 Drawing Sheets

| | |
|---|---|
| TRANSMISSION START, 2006/07/01, 12:00:00, 300dpi, 12p, image.jpg, ¥¥server¥directory, Tanaka | |
| TRANSMISSION END, 2006/07/01, 12:00:10, SUCCESS | |
| TRANSMISSION START, 2006/07/03, 15:00:00, 100dpi, 20p, image2.jpg, ¥¥server2¥directory2, Suzuki | |
| TRANSMISSION END, 2006/07/03, 15:02:00, FAILURE : LACK OF FREE SPACE | |
| . . . | |

IMAGE TRANSMISSION APPARATUS, IMAGE DATA ACQUIRING APPARATUS, IMAGE DATA TRANSMISSION METHOD, PROGRAM FOR IMPLEMENTING THE METHOD, AND STORAGE MEDIUM FOR THE PROGRAM

BACKGROUND OF THE INVENTION

1. Field of the Invention

The present invention relates to an image data transmission apparatus, an image data acquiring apparatus, an image data transmission method, program for implementing the method, and a storage medium for the program, and more particularly, to an image data transmission apparatus for transmitting image data to a designated and/or predetermined destination of image data transmission, an image data acquiring apparatus, an image data transmission method, program for implementing the method, and a storage medium for the program.

2. Description of the Related Art

Conventionally, in image data transmission systems, an image data acquiring apparatus such as a scanner acquires image data of originals, etc., and transmits the acquired image data to an image data server corresponding to a destination of image data transmission through a network, which server accumulates the received image data. This enables the accumulation of a large amount of image data.

There have been proposed solutions as such image data transmission systems where, after the transmission of image data performed by an image data acquiring apparatus, information about the transmitted image data is stored as a log file, including the size, resolution, transmission time and date, file names, destination, user (sender), transmission result of the image data transmission, etc. (see, e.g., Japanese Patent No. 3594799).

A log file storing memory provided in the image data acquiring apparatus, or a log file server for storing log files connected to the image data acquiring apparatus via a network, is used as the storage device of log files.

However, although the log file server can store much more log files when the log file server is selected as the storage device of log files as compared to when the log file storing memory is selected, some situations may arise where log files could not be stored successfully. Possible cause for unsuccessful storing of log files includes unestablishment of communication between the image data acquiring apparatus and the log file server and lack of storage capacity in the log file server.

In this case, even if the image data transmission to the image data server has been completed, log information about the transmission would not be stored as a log file. This results in a problem that the information, such as leakage time and date or a leaker of the information, could not be identified by close investigation of the log files when leakage of the image data to outsiders is caused. In particular, the problem is serious in case of image data with high confidentiality.

Therefore, there is a need for improving reliability of log files.

SUMMARY OF THE INVENTION

The present invention provides an image data transmission apparatus and an image data transmission method which are capable of improving reliability of log files by ensuring proper storing of log information about transferred image data, an image data acquiring apparatus, program for implementing the method, and a storage medium for the program.

In a first aspect of the present invention, there is provided an image data transmission apparatus that transmits image data to a designated destination of image data transmission and/or predetermined destination of image data transmission, comprising a log transmission unit adapted to transmit a preceding log information to a log information storing device connected via a network, the preceding log information including information about the transmission of image data to be transmitted, a determination unit adapted to determine whether the log information storing device has succeeded in receiving or storing the preceding log information, and an image data transmission unit adapted to transmit the image data to the destination of image data transmission, if the determination unit determines that the log information storing device has succeeded in receiving or storing the preceding log information.

In a second aspect of the present invention, there is provided an image data transmission apparatus that transmits image data to a designated destination of image data transmission and/or predetermined destination of image data transmission, comprising a log transmission unit adapted to transmit log information to a log information storing device connected via a network, the log information including information about the transmission of the image data, and an image data transmission unit adapted to, when communication between the log transmission unit and the log information storing device is possible, transmit the image data to the destination of image data transmission.

In a third aspect of the present invention, there is provided an image data acquiring apparatus comprising an image data acquiring unit adapted to read an image of an original and acquire image data thereof, an image data erasing unit adapted to erase the image data acquired by the image data acquiring unit, an image data transmission apparatus according to the first or second aspect of the present invention, and a control unit adapted to, when communication between the image data transmission apparatus and the log information storing device is not possible, cause the image data erasing unit to erase the image data acquired by the image data acquiring unit, without transmission of the image data by the image data transmission apparatus.

In a fourth aspect of the present invention, there is provided an image data acquiring apparatus comprising an image data acquiring unit adapted to read an image of an original and acquire image data thereof, an image data transmission apparatus according to the first or second aspect of the present invention, and a control unit adapted to, when communication between the image data transmission apparatus and the log information storing device is not possible, abort the image data acquiring process performed by the image data acquiring unit.

In a fifth aspect of the present invention, there is provided an image data transmission method of an image data transmission apparatus that transmits image data to a designated destination of image data transmission and/or predetermined destination of image data transmission, comprising a log transmission step of transmitting a preceding log information to a log information storing device connected to the image data transmission apparatus via a network, the preceding log information including information about the transmission of image data to be transmitted from the image data transmission apparatus a determination step of determining whether the log information storing device has succeeded in receiving or storing the preceding log information transmitted in the log transmission step, and an image data transmission step of transmitting the image data from the image data transmission apparatus to the destination of image data transmission, if it is determined in the determination step that the log information storing device has succeeded in receiving or storing the preceding log information.

In a sixth aspect of the present invention, there is provided a program for causing a computer to implement an image data transmission method of an image data transmission apparatus that transmits image data to a designated destination of image data transmission and/or predetermined destination of image data transmission, the program comprising a log transmission module for transmitting a preceding log information to a log information storing device connected to the image data transmission apparatus via a network, the preceding log information including information about the transmission of image data to be transmitted from the image data transmission apparatus, a determination module for determining whether the log information storing device has succeeded in receiving or storing the preceding log information transmitted by the log transmission module, and an image data transmission module for transmitting the image data from the image data transmission apparatus to the destination of image data transmission, if it is determined by the determination module that the log information storing device has succeeded in receiving or storing the preceding log information.

In a seventh aspect of the present invention, there is provided a computer-readable storage medium storing a program according to the sixth aspect of the present invention.

According to the present invention, preceding log information including transmission information of image data to be transmitted to a predetermined destination and/or designated destination of image data transmission is transmitted to a log file server, and the transmission of the image data is performed if the log file server has succeeded in receiving or storing the preceding log information. Alternatively, before the image data transmission is performed it may be confirmed that communication with the log file server is possible. This enables assured storing of the log information about image data transfer and improvements in reliability of log files. As a result, whenever leakage of image data to outsiders has been caused, necessary information such as leakage time and date or a leaker of the image data, can be identified from log files successfully.

Further features and advantages of the present invention will become apparent from the following detailed description of exemplary embodiments with reference to the attached drawings.

DETAILED DESCRIPTION OF THE PREFERRED EMBODIMENTS

The present invention will now be described in detail with reference to the drawings showing a preferred embodiment thereof.

Figure 1:
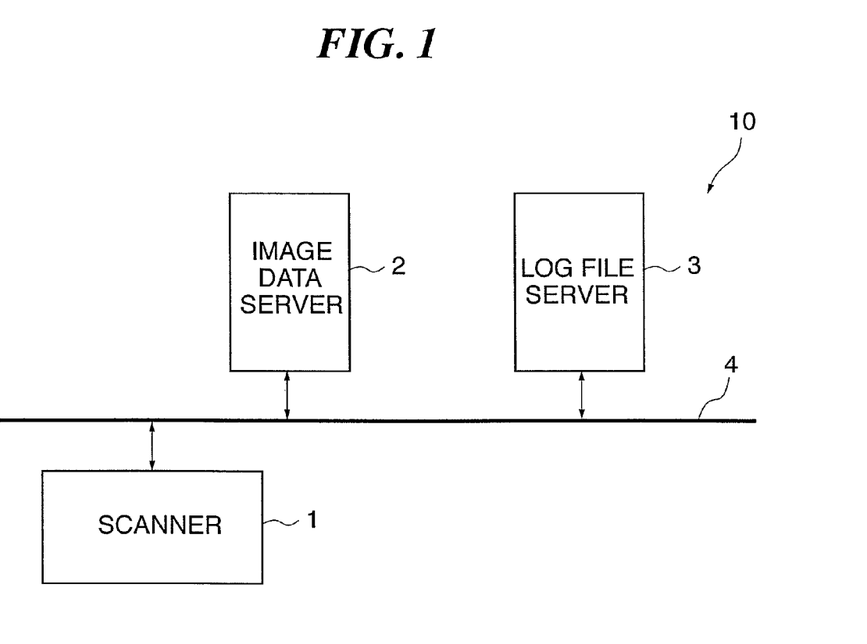
FIG. 1 is a block diagram schematically showing a configuration of an image data transmission system that includes a scanner as an image data acquiring apparatus (image data transmission apparatus) according to an embodiment of the present invention.

FIG. 1 is a block diagram schematically showing a configuration of an image data transmission system that includes a scanner as an image data acquiring apparatus and as an image data transmission apparatus according to an embodiment of the present invention.

The image data transmission system 10 shown in FIG. 1 includes a scanner 1 as an image data acquiring apparatus, an image data server 2, and a log file server 3, which are connected to each other through a network 4. It should be noted that there may be a plurality of image data servers 2 or a plurality of log file servers 3 in FIG. 1. Moreover, the image data server 2 and the log file server 3 may be combined into a single device.

In FIG. 1, the scanner 1 is comprised of a data transmission controller as an image data transmission unit that transmits image data of a original acquired by an image data acquiring process to the image data server 2, which is designated as a destination of image data transmission by a user before the image data acquiring process is started. Moreover, the data transmission controller also has a function to transmit log information about the transmission of the image data and serves as a log transmission unit. The image data server 2, which contains a mass storage device, can store a large amount of image data transmitted from the scanner 1. The log file server 3 as a log information storing device stores log information about the transmission of the image data, e.g., from the scanner 1 to the image data server 2. It should be noted that the log information storing device may be any storage device in any form, such as a hard disk or optical disk device connected to a network instead of the log file server.

As the destination of image data transmission, a Personal Computer (PC) or the like connected to a network may be designated instead of the image data server. Moreover, the destination of image data transmission may be designated by e-mail addresses. In this case, image data would be transmitted to a mail server, not shown, and then transmitted to the destination of image data transmission as an attachment file of the e-mail.

Figure 2:
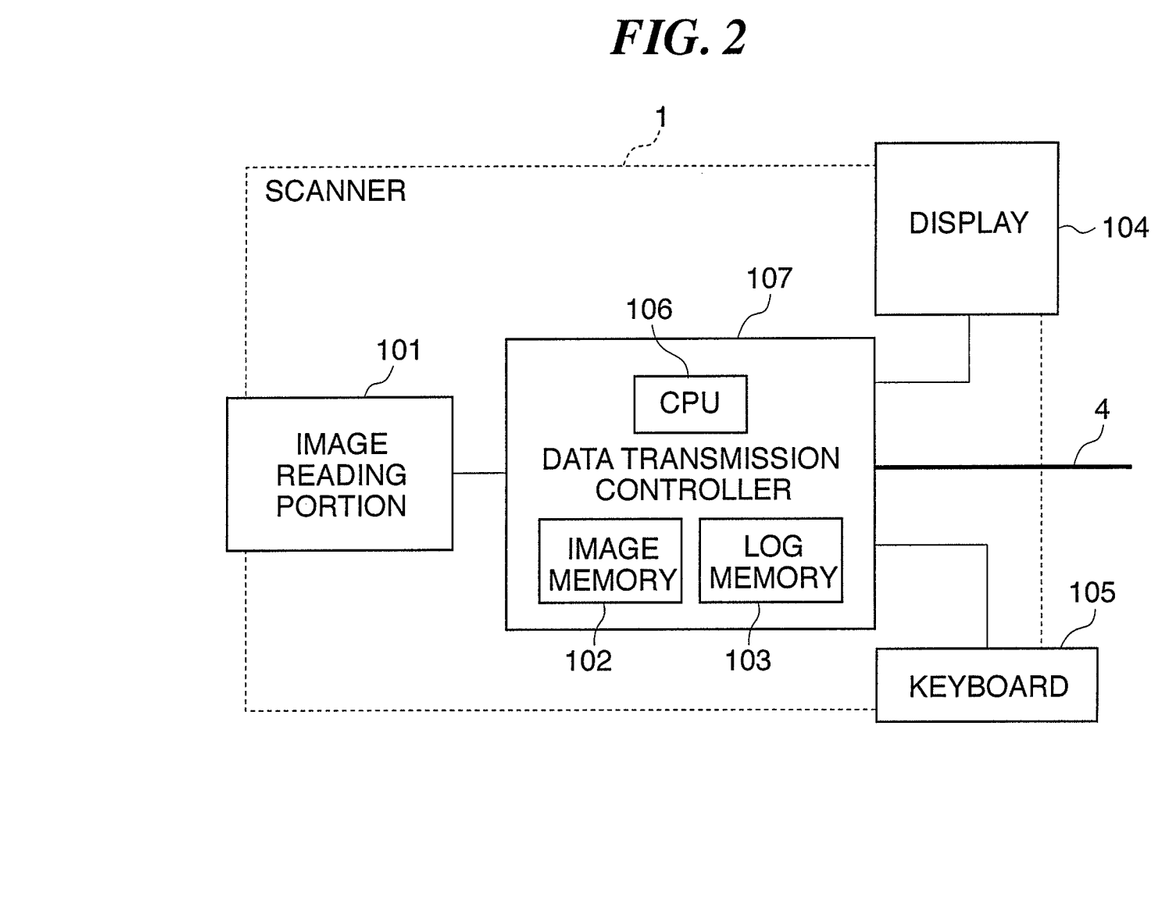
FIG. 2 is a block diagram showing in detail the configuration of the scanner in FIG. 1.

FIG. 2 is a block diagram showing in detail the configuration of the scanner 1 in FIG. 1.

In FIG. 2, the scanner 1 contains an image reading portion 101, a data transmission controller 107, a display 104, and a keyboard 105 through which a user inputs a setting value and instructs the scanner 1 to start its operation. The data transmission controller 107 is connected to the image reading portion 101, the display 104, the keyboard 105, and the network 4.

The image reading portion 101 contains an original detection sensor that detects an original mounted on an original mounting table, a roller and motor that transfers an original, a image sensor that reads images of the original, and an image processing circuit that generates image data based on an output signal of the image sensor and performs image processing. In this way, the scanner 1 serves as the image data acquiring apparatus that obtains image data of the original.

The data transmission controller 107, which contains a CPU 106 that controls the scanner 1 entirely, an image memory 102 that stores image data obtained by the image reading portion 101, and a log memory 103 that temporarily stores the generated log files, performs control for temporarily storing data, such as image data or log files, to transmit the stored data accordingly. The CPU 106 executes programs for performing various processes for performing the following processes: acquiring image data via the image reading portion 101; storing the acquired image data in the image memory 102; storing the created log files in the log memory 103; transmitting the stored log files to the log file server 3; transmitting the stored image data to the image data server 2, and the like. In this way, the CPU 106 controls certain portions or the entire scanner 1 and corresponds to the control unit as recited in the appended claims. Further, the CPU 106 executes another program for determining whether the log file server 3 has succeeded in receiving or storing log files as described below and so corresponds to the determination unit as recited in the appended claims as well. It should be noted that another CPU or hardware may be used as the determination unit. Moreover, hardware may be used as the control unit.

The display 104 displays a window for use in various parameter settings, an image corresponding to image data, and a predetermined message, e.g., an error message.

It should be noted that each of the data transmission controller 107 and the image reading portion 101 in FIG. 2 may be separately provided in two independent devices such as a Personal Computer (PC) and an image reading device, respectively. In such case, the PC and the image reading device are connected to each other via an interface cable.

Figure 3:
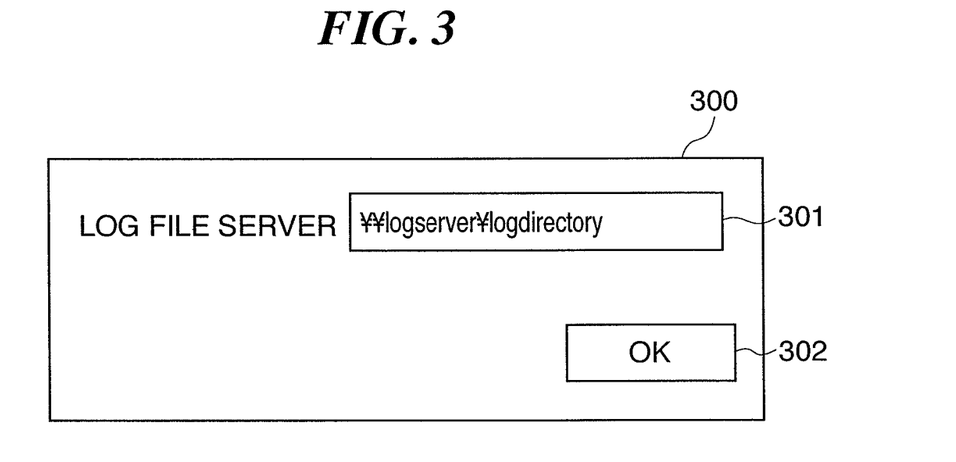
FIG. 3 is a diagram showing an example of a log file server designate window displayed on the display in FIG. 2 when the log file server in FIG. 1 is designated.

FIG. 3 is a diagram showing an example of a log file server designate window displayed on the display 104 in FIG. 2 when the log file server 3 in FIG. 1 is designated.

Arranged on the log file server designate window 300 shown in FIG. 3 are a field 301 for inputting the name of any one of the log file servers or the like to designate the log file servers in the image data transmission system 10 in FIG. 1, and an OK button 302 for fixing a server designated by the name of server or the like inputted to the field 301. It should be noted that addresses on the network 4 or the like may be used in place of the name of server.

For example, by designating a log file server in the log file server designate window 300 as shown in FIG. 3, the log file server 3 is determined to be a log file server with which the scanner 1 establishes a communication in the image data transmission system 10 of FIG. 1.

Figure 4:
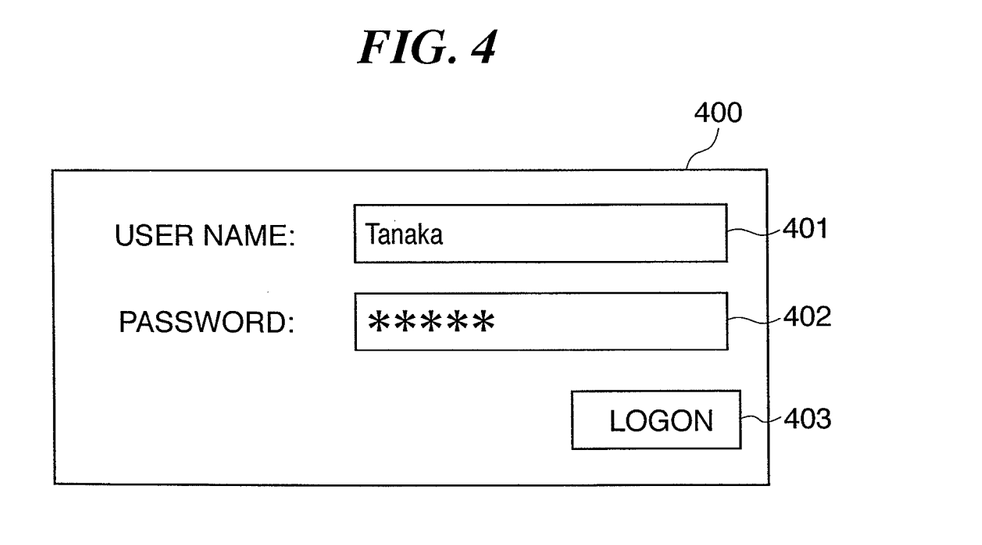
FIG. 4 is a diagram showing an example of a logon window displayed on the display.

FIG. 4 is a diagram showing an example of a logon window displayed on the display 104 of FIG. 2.

Arranged on a logon window 400 shown in FIG. 4 are: fields 401 and 402 for inputting a user name and password which enables identification of the sender, i.e., the user of the scanner 1, who instructs to transmit image data to be acquired; and a logon button 403 for starting authentication of the user.

As shown in FIG. 4, upon the user name and password being inputted by a user in the logon window 400, the user who attempts to use the scanner 1 is identified in the image data transmission system 10 of FIG. 1.

Figure 5:
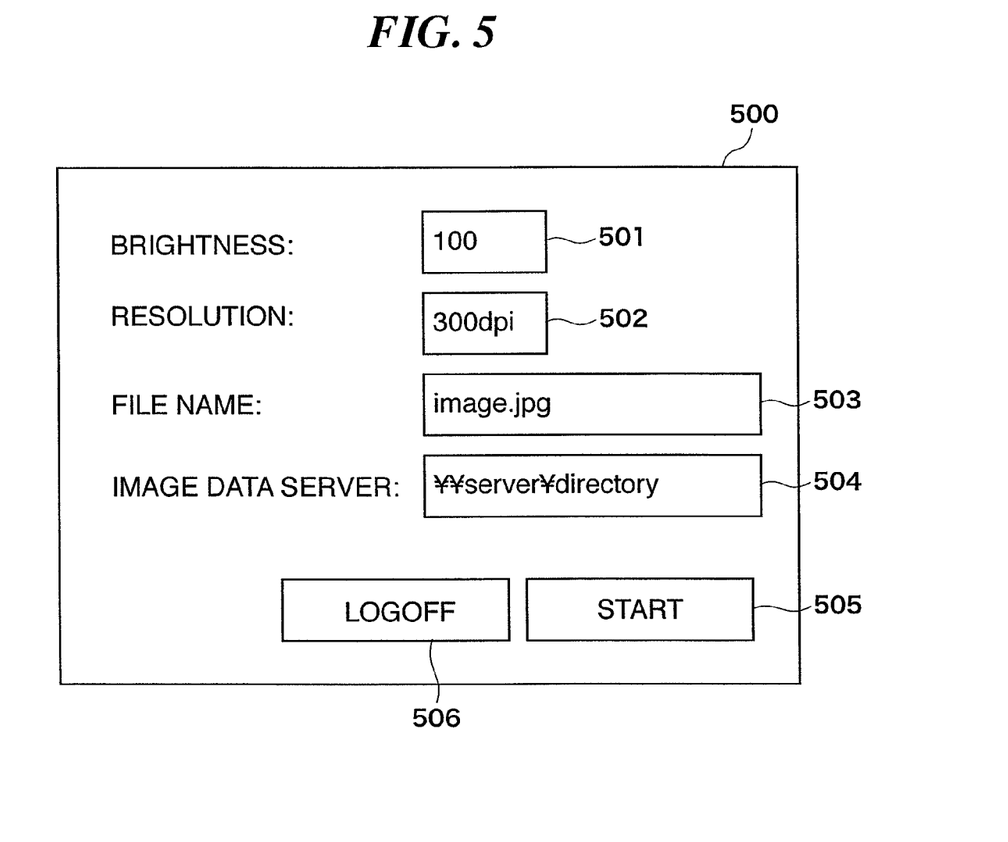
FIG. 5 is an example of an image reading condition setting window displayed on the display in FIG. 2 when a user performs a logon procedure through the user selection window of FIG. 4.

FIG. 5 is an example of an image reading condition setting window displayed on the display 104 in FIG. 2 when a user performs a logon procedure through the logon window 400 of FIG. 4.

Arranged on the image reading condition setting window 500 shown in FIG. 5 are: fields 501 and 502 for inputting the brightness and resolution corresponding to the image reading conditions on which the image reading portion 101 acquires image data; a field 503 for inputting a file name to be added to the acquired image data; a field 504 for inputting an image data server name, a folder name and the like that is designated by the user of scanner 1 as a destination of image data transmission; a start button 505 for causing the scanner 1 to start acquiring image data; and a logoff button 506 for returning to the logon window 400 of FIG. 4. It should be noted that e-mail addresses or addresses of PCs on the network 4 may be used in place of the name of server.

As shown in FIG. 5, by inputting an image data server name, a folder name and the like in the image reading condition setting window 500, the image data server 2 is determined to be a destination of the image data obtained by the scanner 1 in the image data transmission system 10 of FIG. 1.

Figure 6:
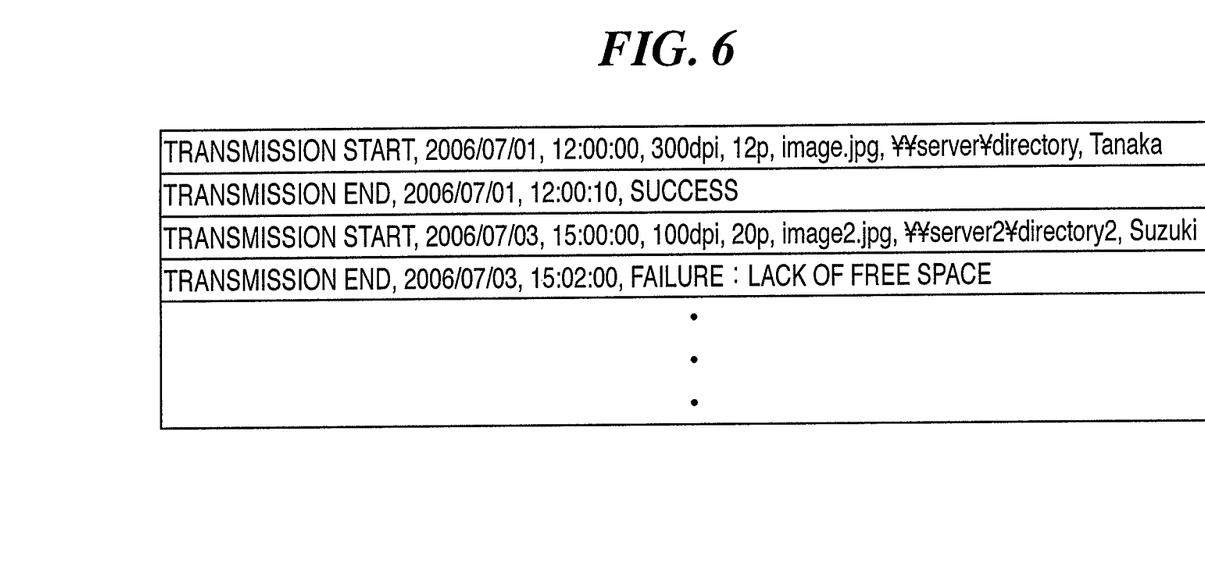
FIG. 6 is a diagram showing an example of a list display window on which the log information stored on the log file server (as shown in FIG. 1) is displayed.

FIG. 6 is an example of a list display window on which the log information stored on the log file server 3 in FIG. 1 is displayed.

The scanner 1 temporarily stores a created preceding log (first log information) in the log memory 103 which is a built-in memory, transmits the preceding log to the log file server 3 before transmitting image data to the image data server 2, and causes the log file server 3 to store the preceding log accordingly. Further, after the transmission of the image data, the scanner 1 creates a succeeding log (second log information) to temporarily store it in the log memory 103, transmits that log information to the log file server 3, and causes the log file server 3 to store the succeeding log accordingly.

In the example shown in FIG. 6, logs in the first and third lines are preceding logs, which include information such as the year, month, date and time of the transmission of the image data, the resolution and the number of pages of image data to be transmitted, the file name of the image data, the image data server name and the folder name, and the user name.

Moreover, a log in the second line in FIG. 6 is the succeeding log corresponding to the preceding log in the first line, which includes a character string indicating transmission success of image data and information about the year, month, date and time of the transmission success. A log in the fourth line is the succeeding log corresponding to the preceding log in the third line, which includes a character string indicating transmission failure of image data, a character string indicating the cause of the transmission failure, and information about the year, month, date and time of the transmission failure.

Possible cause of the transmission failure of image data includes a failure of establishment of communication to the image data server 2 via the network 4, lack of free space in the image data server 2, or the like.

That is, the succeeding log in the second line indicates that the scanner 1 has succeeded in the transmission of the image data to the image data file server 2, while the succeeding log in the fourth line indicates that the scanner 1 has failed in that transmission.

Figure 7:
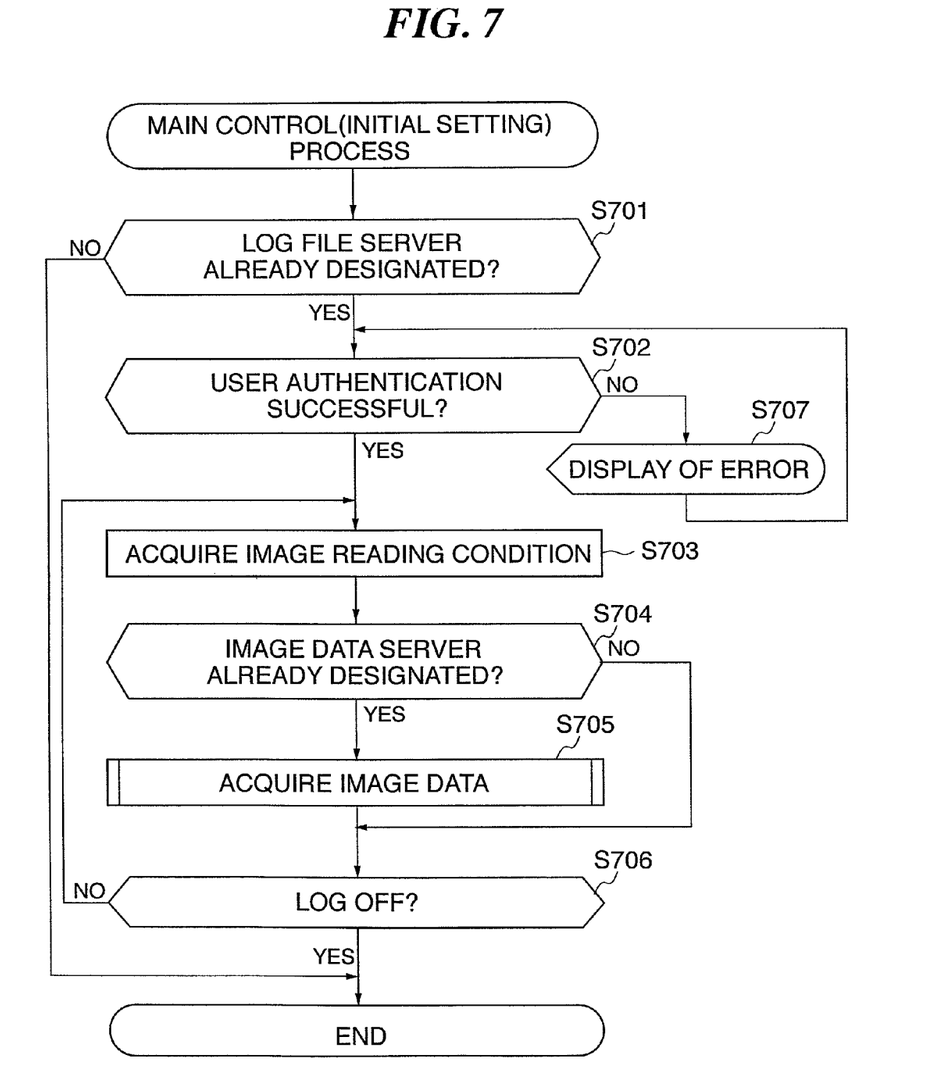
FIG. 7 is a flowchart mainly showing an initial setting process of the image data transmission process executed by the scanner in FIG. 1.
Figure 8:
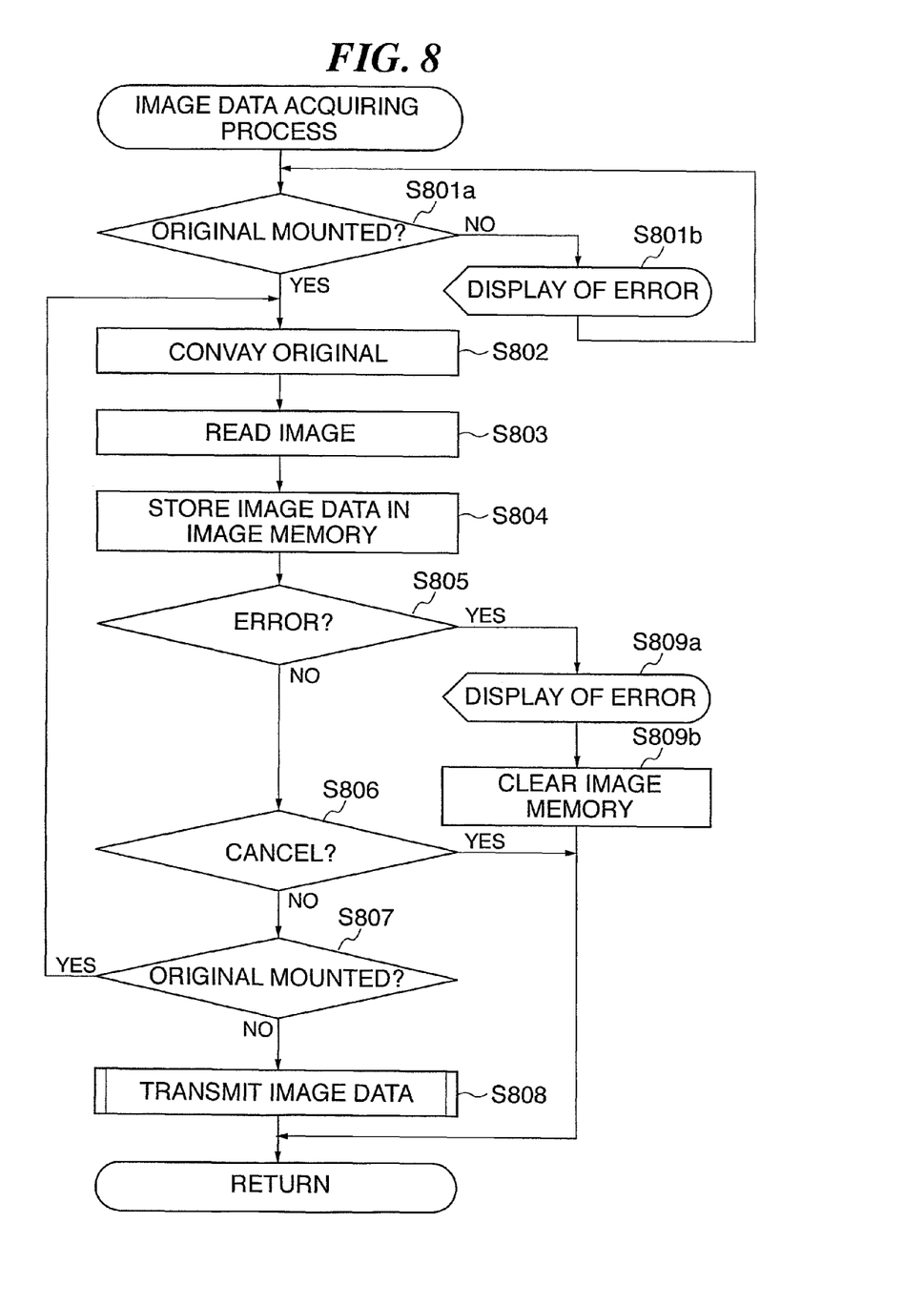
FIG. 8 is a flowchart showing in detail the image data acquiring process executed by the scanner in step S705 in FIG. 7.
Figure 9:
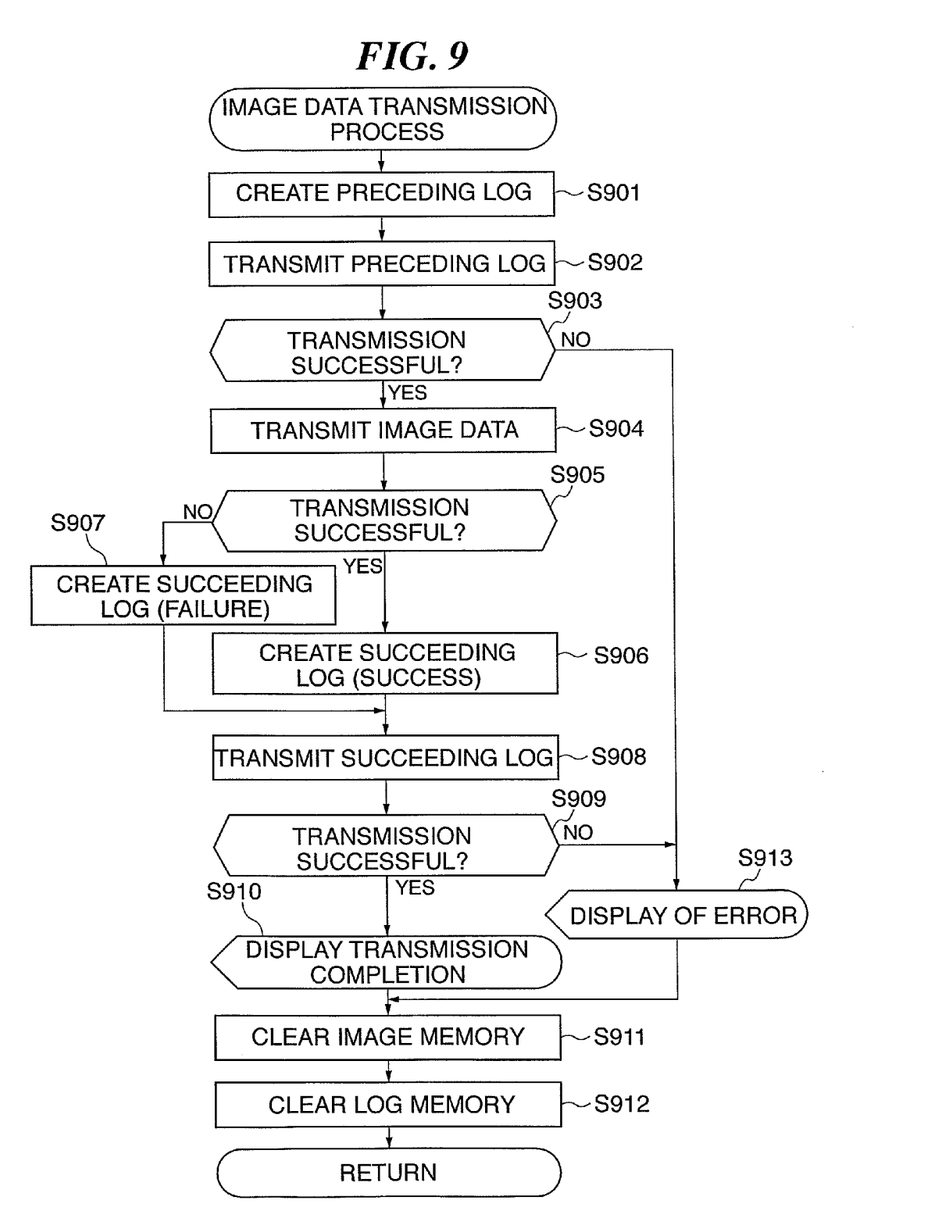
FIG. 9 is a flowchart showing in detail the image data transmission process executed by the scanner in step S808 in FIG. 8.

FIGS. 7 to 9 are flowcharts of image data transmission programs running on the CPU 106 of the scanner 1. FIG. 7 is an outlined flowchart of main control process mostly illustrates an initial setting process performed by the image data transmission program; FIG. 8 mainly illustrates an image data acquiring process performed by the image data transmission program; and FIG. 9 mainly illustrates an image data transmission process performed by the image data transmission program.

In FIG. 7, firstly in step S701, it is determined whether or not designating process is completed that designates, e.g., the log file server 3 as a destination of log information transmission through the log file server designate window 300. In this case, the designation of log file server can be performed only by an administrator or the like, who designates a log file server in advance of using of the scanner 1. If the designation of the log file server has been performed by the administrator or the like (YES to the step S701), then it is determined that whether or not authentication of a ordinary user, i.e., the sender is successful in authentication process performed on the information such as a user ID and/or password (step S702).

If the authentication of the user is successful (YES to the step S702), then the image reading conditions including the brightness, resolution, and file name of the image data inputted by the user through the image reading condition setting window 500 are acquired (step S703). And it is determined whether or not designating process is completed that designates, e.g., the image data server 2 as the destination of image data transmission (step S704).

When the start button 505 is pressed on the image reading condition setting window 500, if the image data server 2 is designated (YES to the step S704), the scanner 1 performs the image data acquiring process of FIG. 8 (including the image data transmission process of FIG. 9) (step S705), and the process proceeds to step S706. On the other hand, if the image data server 2 is not designated, or otherwise an error is found in the inputted name of image data server or the like, then in step S706, it is determined whether or not the logoff button 506 is pressed, i.e., the user performs a logoff procedure. In this case, if an error is found in the name of server or the like, it is preferred that a predetermined error message is displayed on the display 104.

In the step S706, if it is determined that the user performs a logoff procedure, then the process is terminated, or otherwise, the processes of the steps S703 to S705 are repeated.

In the step S702, if it is determined that the authentication of the user is failed, then a predetermined error message is displayed on the display 104 (step S707) to prompt the user to reenter the user name and password, and the process returns to the step S702.

When the log file server 3 is not designated by the administrator it should be noted, in the step S701 in FIG. 7, the process may be performed such that the predetermined error message is displayed on the display 104 at the start time of logon procedure by the user in the step S702, or at the start time of the image data acquiring process of the step S705 to prohibit the acquisition of image data, rather than immediately terminating the process.

Moreover, it should be noted that the designation of the log file server 3 in the step S701 of FIG. 7 may be performed only once by the administrator of the scanner 1 at the time of purchase. In this case, except when the log file server is changed, execution of the process in the step S701 of FIG. 7 and display of the log file server setting window 300 of FIG. 3 can be omitted, and whenever necessary the log file server setting window 300 is configured as being displayable.

FIG. 8 is a flowchart showing in detail the image data acquiring process executed by the scanner 1 in step S705 in FIG. 7.

In FIG. 8, firstly in step S801a, in response to the pressing of the start button 505, the image reading portion 101 of the scanner 1 determines whether an original is mounted on the original-mounting table by using the original detection sensor, for starting of a conveying process of the original.

If an original is mounted on the original-mounting table (YES to the step S801a), then the original is conveyed by driving the roller with the motor or the like (step S802), an image of the original is read by the image sensor (step S803), and the image data acquired from the output signal of the image sensor is stored in the image memory 102 (step S804).

If no error is found such as a paper jam or lack of free space in the image memory 102 (NO to step S805) and if no instruction for canceling acquisition of the image data is instructed by the user (NO to step S806), i.e., if image reading of the original being conveyed is normally terminated, then it is determined whether the next original exists or not (step S807).

In step S807, if the next original exists, then the image reading process of the steps S802 to S807 are repeated, whereas if the next original does not exist, i.e., there remains no original with image to be read, then the image data acquiring process is terminated and the image data transmission process of FIG. 9 is performed (step S808). When the image data transmission process is terminated, the process returns to the step S706 in FIG. 7.

If there does not exist any original to be read (NO to the step S801a), then an error message is displayed to prompt the user to set the original on the original mounting table (step S801b), and the process returns to the step S801a. Alternatively, if an error occurs (YES to the step S805), then a predetermined error message is displayed on the display 104 (step S809a), the image memory 102 is cleared (step S809b), and the process returns to the step S706 in FIG. 7. Furthermore, if the user instructs the cancellation of the image data acquiring process (YES to the step S806), then the process returns to the step S706 in FIG. 7 to terminate the process.

It should be noted that the scanner 1 may perform the image data acquiring process of FIG. 8 in parallel with the image data transmission process of FIG. 9.

Moreover, the scanner 1 may be configured to attempt to establish a communication with the log file server before the starting of the image data acquiring process, or during the execution thereof. In this case, it may be modified to suspend and abort the process of FIG. 8 and display a predetermined error message on the display 104 before the starting of the image data acquiring process, or during the execution thereof, when the communication with the log file server could not be established.

FIG. 9 is a flowchart showing in detail the image data transmission process executed by the scanner 1 in the step S808 in FIG. 8.

In FIG. 9, firstly in step S901, the scanner 1 creates a preceding log, e.g., as shown in the first line in FIG. 6, and stores it in the log memory 103 before transmitting image data to the image data server 2. It is preferred that the preceding logs and succeeding logs can be created directly in the log memory 103.

In the following step S902, the scanner 1 transmits the preceding log stored in the log memory 103 to the log file server 3 as a log file by using the SMB (Server Message Block) which is a file sharing protocol, and determines whether the transmission of the preceding log is successful (step S903). As such, the program running on the CPU 106 and/or CPU 106 corresponds to the determination unit as recited in the appended claims.

The determination in the step S903 may be made, e.g., based on the response from the log file server 3 at the time of the transmission of the preceding log. Moreover, the determination in the step S903 can be made by determining whether the preceding log received by the log file server 3 from the scanner 1 is stored successfully or not. For example, the log file server 3 may be configured to notify the scanner 1 of the fact that the preceding log has been stored successfully with a predetermined message or the like. In this way, in the step S903, a determination is made preferably as to whether or not the log file server 3 has succeeded in storing the preceding log. However in the other embodiment, in the step S903, a determination may be made as to whether or not the log file server 3 has succeeded in receiving the preceding log.

If the preceding log is successfully transmitted to the log file server 3 (YES to the step S903), then the scanner 1 transmits image data stored in the image memory 102 to the image data server 2 by using the SMB (step S904), and determines whether the transmission of the image data is successful (step S905).

If it is determined in step S905 that the image data is successfully transmitted to the image data server 2, then the scanner 1 creates a succeeding log (see the second line in FIG. 6) that includes information indicative of the transmission success of image data, and temporarily stores it in the log memory 103 (step S906), and then the process proceeds to step S908. On the other hand, if the image data is not successfully transmitted to the image data server 2, the scanner 1 creates a succeeding log (see the fourth line in FIG. 6) that includes information indicative of the transmission failure of image data, and temporarily stores it in the log memory 103 (step S907), and then the process proceeds to step S908.

In the following step S908, the scanner 1 transmits the succeeding log stored in the log memory 103 to the log file server 3 as a log file by using the SMB, and determines whether the transmission of that succeeding log is successful (step S909). Similar to the determination in the step S903, it is preferred that the determination of the step S909 can also be made by receiving, e.g., some message from the log file server 3, as to whether or not the log file server 3 has succeeded in storing the succeeding log received from the scanner 1. In this way, in the step S909, a determination is made preferably as to whether or not the log file server 3 has succeeded in storing the succeeding log. However in the other embodiment, in the step S909, a determination may be made as to whether or not the log file server 3 has succeeded in receiving the succeeding log.

If the succeeding log is successfully transmitted to the log file server 3 (YES to the step S909), then displayed on the display 104 which is a display unit is a message indicating the normal completion of the transmission of the succeeding log to the log file server 3 (step S910).

Then, the image memory 102 and the log memory 103 are cleared (steps S911 and S912) and the image data transmission process is terminated, and then the process returns to the step S706 of FIG. 7.

If the succeeding log is not successfully transmitted to the log file server 3 (NO to the step S909), then displayed on the display 104 is a massage indicating the failure of the transmission of the succeeding log to the log file server 3 and the cause of that failure (step S913) Moreover, the image memory 102 and the log memory 103 are cleared in the steps S911 and S912, and then the image data transmission process is terminated. It is preferred that, if the transmission of the succeeding log is not successful, the current image data that has just been transmitted to the image data file server 2 is cleared by the image data file server 2.

If the preceding log is not successfully transmitted to the log file server 3 (NO to the step S903), displayed on the display 104 is a message indicating the cancellation of the image data transmission process, as well as the failure of the transmission of the preceding log to the log file server 3 and the cause of that failure (step S913). Moreover, the image memory 102 and the log memory 103 are cleared in the steps S911 and S912 without performing the transmission of the image data, and then the image data transmission process is terminated. As such, since the transmission of the image data is canceled by the program running on the CPU 106, the CPU 106 and/or program correspond to the transmission cancellation unit as recited in the appended claims.

Here, probable causes of the transmission failure of preceding log include failure of establishment of communication with the log file server 3 through the network 4 and lack of free space in the log file server 3.

According to the process of FIG. 9, if the preceding log is not successfully transmitted to the log file server 3 (NO to the step S903), the image memory 102 is cleared (step S911) without transmitting the image data to the image data server 2 in the step S904. In other words, in the case where the log file server 3 cannot receive or store the log file, then the image data stored in the image memory 102 is erased without performing the transmission of the image data to the image data server 2 even if the transmission of the image data is possible. As such, since the image data is erased by the program running on the CPU 106, the CPU 106 and/or program correspond to the image data erasing unit as recited in the appended claims. This makes it possible to successfully prevent leakage of image data to outsiders.

Moreover, in this embodiment, log files stored in the log file server 3 includes log information about image data being transferred from the scanner 1 to the image data server 2, and those files are assured to be stored successfully, which provides high reliability of log files. As a result, whenever any image data leaks to outsiders, the leakage time, date, and leaker of the image data can be easily identified by close investigation of the log files.

In this embodiment, only when the preceding log is successfully transmitted to the log file server 3 the image data stored in the image memory 102 is transmitted to the image data server 2. However, the present invention is not limited to this. In an alternative embodiment the image data stored in the image memory 102 may be transmitted to the image data server 2 when communication between the data transmission controller 107 and the log file server 3 is possible. For example, the data transmission controller 107 may only confirm whether it can communicate with the log file server 3 before the transmission of the image data, especially in the case that the size of image data is small. Moreover, in the case that the image data is transmitted separately in pieces of partial data, the data transmission controller 107 may transmit one or more pieces of partial data to the image data server 2 each time the possibility of communication with the log file server 3 being confirmed. Further, in other alternative embodiment, when there are one or more last pieces of partial data left, the data transmission controller 107 may confirm whether it can communicate with the log file server 3. In this case, the one or more last pieces of partial data may be transmitted to the image data server 2 when communication between the data transmission controller 107 and the log file server 3 is confirmed to be possible. Moreover, in the case where a single piece of image data is transmitted separately in pieces of such partial data, it should be noted that the construction of image data may be contrived so that the contents of image data would be incomprehensible unless the image data server 2 received the last piece of partial data.

Furthermore, if the last piece of partial data is not transmitted to the image data server 2, it is preferred that the image data server 2 is forced to discard the other pieces of partial data previously received.

Moreover, if a single piece of image data is transmitted separately in pieces of partial data, and if the preceding log and the succeeding log are transmitted, the preceding log (first log file) needs only to be transmitted at least prior to the transmission of the last piece of partial data, meanwhile the succeeding log (second log file) needs only to be transmitted at any point in time at least after the transmission of the first piece of partial data is started or at least after the transmission of the first piece of partial data is completed. However, it is assumed that the preceding log is transmitted prior to the transmission of the succeeding log. Also it is assumed that between the preceding log (first log file) and the succeeding log (second log file) some other log files including information about the same transmission of image data may be received or stored by the log file server 3 (log information storing device). And also it is assumed that some other log files including information about the same transmission of image data may be received or stored by the log file server 3 before the preceding log is received or stored by the log file server 3.

Further, in this embodiment, image data may be transmitted to predetermined image data server or transmitted to both of designated image data server and predetermined image data server. Further, in this embodiment, although authentication of user is performed using the name and password inputted by the user, in an alternative embodiment, it may be performed, e.g., using ID cards or biometrics authentication based on the user's biometrics. Moreover, modifications can be made to this embodiment so that a part or all of the processes performed by the program running on the CPU 106 may be performed by hardware. And in a system containing a host computer and interconnected image data acquiring apparatus, the host computer and the image data acquiring apparatus may in cooperation perform above described operations. And then above-mentioned system corresponds to the image data acquiring apparatus of this invention.

Further, in this embodiment, although the transmission of the log files such as the preceding logs or the succeeding logs and the transmission of the image data are performed by means of the SMB protocol, it may be performed by means of facsimile or those protocols such as SMTP (for mail transmission) or FTP (for file transfer) protocol.

Further, although the image data transmission apparatus in accordance with this embodiment is described as the image data acquiring apparatus such as the scanner 1, it may be an image forming apparatus such as a copier, printer or facsimile, an imaging device such as a camera, or the like.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magneto-optical disk, an optical disk such as a CD-R, a CD-RW, a DVD-ROM, a DVD-RAM, a DVD-RW, a DVD+RW, a magnetic tape, a non-volatile memory card, and a ROM. Alternatively, the program code may be downloaded via a network.

Further, it is to be understood that the functions of the above described embodiment may be accomplished not only by executing a program code read out by a computer, but also causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-305802, filed Nov. 10, 2006, which is hereby incorporated by reference herein in its entirety.

What is claimed is:

1. An image data transmission apparatus that transmits image data of an original to a designated destination of image data transmission and/or a predetermined destination of image data transmission, the apparatus comprising:
   an acquiring unit configured to acquire the image data;
   a log transmission unit configured to transmit preceding log information to a log information storing device connected via a network before said acquiring unit starts acquiring the image data or while said acquiring unit acquires the image data, the preceding log information including information about transmission of the image data to be transmitted;
   a determination unit configured to determine whether the log information storing device has succeeded in receiving or storing the preceding log information; and
   an image data transmission unit configured to transmit the image data to the designated destination of image data transmission, if said determination unit determines that the log information storing device has succeeded in receiving or storing the preceding log information,
   wherein, after said image data transmission unit has started transmission of the image data, said log transmission unit transmits succeeding log information to the log information storing device, the succeeding log information including information indicative of whether the transmission of the image data is successful.

2. The image data transmission apparatus according to claim 1, further comprising a transmission cancellation unit configured to cancel the transmission of the image data performed by said image data transmission unit, if said determination unit determines that the log information storing device has failed in receiving or storing the preceding log information.

3. The image data transmission apparatus according to claim 1, further comprising a display unit configured to display a predetermined error message, if said determination unit determines that the log information storing device has failed in receiving or storing the preceding log information.

4. The image data transmission apparatus according to claim 1, wherein, after said image data transmission unit starts the transmission of the image data, said log transmission unit transmits succeeding log information to the log information storing device, the succeeding log information including information indicative of whether the transmission of that image data is successful.

5. The image data transmission apparatus according to claim 1, wherein the transmission information of the image data includes at least the time for transmitting the image data, the destination of image data transmission, and information about a user.

6. An image data transmission apparatus as in any of claims 1 to 5, further comprising:
an image data acquiring apparatus that includes:
an image data acquiring unit configured to read an image of an original and acquire image data thereof;
an image data erasing unit configured to erase the image data acquired by said image data acquiring unit; and
a control unit configured to, when communication between the image data transmission apparatus and the log information storing device is not possible, cause said image data erasing unit to erase the image data acquired by said image data acquiring unit, without transmission of the image data by said image data transmission apparatus.

7. An image data transmission apparatus as in any of claims 1 to 5, further comprising:
an image data acquiring apparatus that includes:
an image data acquiring unit configured to read an image of an original and acquire image data thereof; and
a control unit configured to, when communication between the image data transmission apparatus and the log information storing device is not possible, abort an image data acquiring process performed by said image data acquiring unit.

8. An image data transmission method of an image data transmission apparatus that transmits image data of an original to a designated destination of image data transmission and/or a predetermined destination of image data transmission, the method comprising:
acquiring the image data;
transmitting preceding log information to a log information storing device connected to the image data transmission apparatus via a network before the acquiring starts acquiring the image data or while the acquiring acquires the image data, the preceding log information including information about transmission of the image data to be transmitted from the image data transmission apparatus;
determining whether the log information storing device has succeeded in receiving or storing the preceding log information;
transmitting the image data from the image data transmission apparatus to the designated destination of image data transmission, upon determining that the log information storing device has succeeded in receiving or storing the preceding log information; and
transmitting succeeding log information to the log information storing device, after said transmitting of the image data has started, the succeeding log information including information indicative of whether the transmission of the image data is successful.

9. A non-transitory computer-readable storage medium storing a computer-executable program that, when executed, causes a computer to perform an image data transmission method of an image data transmission apparatus that transmits image data of an original to a designated destination of image data transmission and/or a predetermined destination of image data transmission, the method comprising:
acquiring the image data;
transmitting preceding log information to a log information storing device connected to the image data transmission apparatus via a network before the acquiring starts acquiring the image data or while the acquiring acquires the image data, the preceding log information including information about transmission of the image data to be transmitted from the image data transmission apparatus;
determining whether the log information storing device has succeeded in receiving or storing the preceding log information;
transmitting the image data from the image data transmission apparatus to the designated destination of image data transmission, upon determining that the log information storing device has succeeded in receiving or storing the preceding log information; and
transmitting succeeding log information to the log information storing device, after said transmitting of the image data has started, the succeeding log information including information indicative of whether the transmission of the image data is successful.

* * * * *